United States Patent Office 3,526,830
Patented Sept. 1, 1970

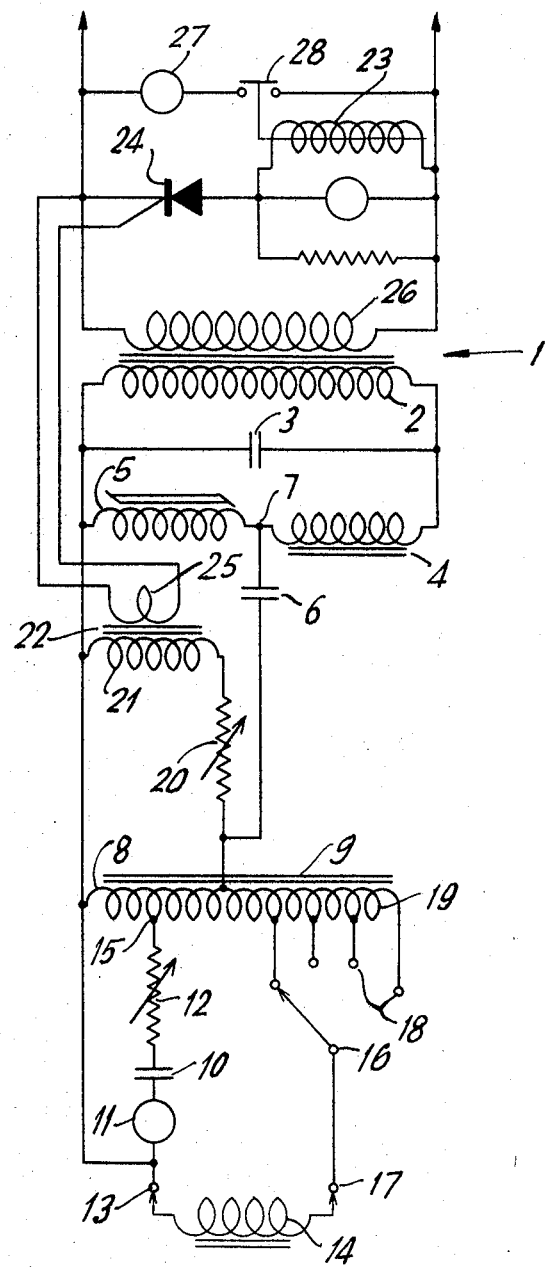

3,526,830
COIL WINDING TESTER INCLUDING CHOPPED WAVE OSCILLATORY CIRCUIT
Koichi Azuma, 22 Miyuki, Shikamaku, Himeji, Japan
Filed Sept. 23, 1968, Ser. No. 761,493
Int. Cl. G01r 31/02
U.S. Cl. 324—51   9 Claims

ABSTRACT OF THE DISCLOSURE

A coil winding tester includes a step-up power transformer connected across a pair of A.C. input terminals. A chopped wave oscillatory circuit includes a current limiting reactor and a saturable reactor connected in series across the secondary of the power transformer, an output transformer, and a condenser connected between the junction point of the two reactors and a terminal of the primary of the output transformer. A pair of output terminals, for connection to a coil winding to be tested, are connected respectively to the other terminal of the primary winding of the output transformer and to a selector switch selectively engageable with taps of the secondary winding of the output transformer. A first detecting circuit includes a galvanometer and associated components connected across a portion of the primary winding of the output transformer. A second detecting circuit includes a third transformer connected across the primary winding of the output transformer and having its secondary winding connected to the gating circuit of an SCR. The SCR is connected across the primary winding of the power transformer in series with the operating winding of a magnetic switch. The magnetic switch includes contacts in series with a buzzer in a circuit connected across the primary winding of the power transformer.

BACKGROUND OF THE INVENTION

Many coil winding testers are known and used commercially, and these may be classified into several different types. In the first type, high voltage pulses are produced by a thyratron oscillator and the absorption rate of the pulses by a coil winding to be tested is read directly on a cathode ray tube. In a second type, a high frequency high voltage is produced by a vacuum tube oscillator, and a drop rate of the voltage across a coil winding to be tested is indicated by a meter. In a third type, a high frequency low voltage is produced by a vacuum tube oscillator, and the deviation from the resonance frequency produced by a coil winding to be tested is indicated by a meter.

These various types of prior art coil winding testers have several disadvantages. The first type mentioned is characterized by its large size, high weight, and difficult handling due to inevitable frequency adjustments for the cathode ray tube. All of the three types mentioned rely on thyratrons or vacuum tubes which not only complicate the testers but also result in a short useful life of only two or three years. In addition, reading of the indication of the cathode ray tube or of the meter requires several seconds, and this is deleterious with respect to automatic selection.

SUMMARY OF THE INVENTION

This invention relates to coil winding testers and, more particularly, to an improved and simplified coil winding tester for detecting short circuits in winding layers of a coil winding such as used as a component of electric or electronic instruments or apparatus.

An object of the present invention is to provide a new and improved type of coil winding tester constructed with components having a semi-permanent life.

Another object of the invention is to provide a new and improved coil winding tester which has a compact structure and a long life of its components.

A further object of the invention is to provide a new and improved coil winding tester including a chopped wave oscillatory circuit and a chopped wave detecting circuit for testing a coil winding with high sensitivity and great reliability.

Another object of the invention is to provide a new and improved coil winding tester which detects a short circuit in a winding layer instantaneously.

A further object of the invention is to provide a new and improved coil winding tester including a detecting circuit which enables the tester to be utilized in an automatic coil winding selection operation.

In accordance with the present invention, a coil winding tester comprises a chopped wave oscillatory circuit including a power transformer, a power factor improvement condenser connected in parallel with the secondary winding of the transformer, a series connection of a current limiting reactor and a magnetic switch of the trochoidal coil saturable reactor type connected in parallel with the secondary winding of the power transformer, and a chopped wave oscillatory circuit condenser having one end connected to the junction point of the two reactors and its other end connected to the primary winding of a chopped wave oscillatory circuit output transformer.

The coil winding tester further comprises a chopped wave detecting circuit including a load balance stabilizing condenser, a galvanometer for reading the test results, a variable resistor for adjustment of the galvanometer, and one terminal of a pair of terminals arranged for connecting a coil winding to be tested. All of these components are connected in series to an intermediate tap of the primary winding of the output transformer. A selection switch is connected to the other terminal arranged for connection to a coil winding to be tested and is selectively engageable with a selected one of several intermediate taps provided in the secondary winding of the output transformer.

The coil winding tester in accordance with the invention further includes another chopped wave detecting circuit including the primary winding of a gating transformer and a variable resistor connected in parallel with the primary winding of the output transformer. This further detecting circuit includes also a silicon controlled rectifier (SCR) having its gating circuit connected to the secondary winding of the gating transformer. The SCR is connected, in series with a relay winding, across the primary winding of the power transformer. A buzzer is connected, in series with the normally open contacts of the relay, across the primary winding of the power transformer. Gating of the SCR energizes the relay winding to close its contacts to energize the buzzer.

For an understanding of the principles of the invention, reference is made to the following description of a typical embodiment thereof as illustrated in the accompanying drawing.

BRIEF DESCRIPTION OF THE DRAWING

In the drawing, the single figure is a schematic wiring diagram of a coil winding tester embodying the invention.

DETAILED DESCRIPTION OF THE PREFERRED EMBODIMENT

Referring to the drawing, a coil winding tester embodying the invention is illustrated as comprising a power transformer 1 having a primary winding 26 connected to terminals arranged for connection to a source of AC potential. Transformer 1 includes a secondary winding 2, which substantially steps up the voltage applied to primary winding 26. A power factor improvement condenser 3 is connected across secondary winding 2.

The coil winding tester further comprises a chopped wave oscillatory circuit which includes a current limiting reactor 4 and a magnetic switch 5, in the form of a trochoidal coil-type saturable reactor, connected in series across or in parallel with secondary winding 2. The oscillatory circuit includes a chopped wave oscillatory circuit condenser 6 which has one end connected to the junction point 7 of reactors 4 and 5. The other end or terminal of condenser 6 is connected to one terminal of the primary winding 8 of a chopped wave oscillatory circuit output transformer 9.

A first chopped wave detecting circuit includes a load balance stabilizing condenser 10, a galvanometer 11 for reading a test result, a variable resistor 12 for adjustment of galvanometer 11, and a terminal 13. All of these components are connected in series to an intermediate tap 15 of primary winding 8 of output transformer 9. Test terminal 13 and a second test terminal 17 are constructed and arranged for connection thereto of a coil winding 14 to be tested.

This detecting circuit further includes a selection switch 16 connected to the test terminal 17 for coil 14, and switch 16 is arranged to be selectively connected to one of several intermediate taps 18 of secondary winding 19 of output transformer 9.

The coil winding tester embodying the invention and illustrated in the drawing also includes a second chopped wave detecting circuit which includes a variable resistor 20 connected, in series with the primary winding 21 of a gating transformer 22, across the primary winding 28 of output transformer 9. This second circuit further includes an SCR 24 having its gating circuit connected across secondary winding 25 of gating transformer 22. SCR 24 is connected, in series with a relay winding 23, across the primary winding 26 of transformer 1. Additionally, a buzzer 27 is connected, in series with the normally open contacts 28 operated by relay 23, across the primary winding 26 of power transformer 1. Relay winding 23 is so arranged that it operates to close contacts 28 to energize buzzer 27 when SCR 24 is gated conductive.

When the coil winding tester of the invention is connected to a source of AC potential at a standard commercial voltage, through the input terminals connected to primary winding 26 of power transformer 1, the output voltage induced in secondary winding 2 of transformer 1 is increased to a value in excess of 200 volts, and this potential is applied to saturable reactor 5 through the current limiting reactor 4. With the increase in the voltage across secondary winding 2 of transformer 1, the voltage across saturable reactor 5 correspondingly increases and condenser 6 is correspondingly progressively charged. This is due to the fact that condenser 6 is in parallel connection with saturable reactor 5 through primary winding 8 of output transformer 9.

When the voltage across the terminals of saturable reactor 5 reaches saturation, the charge stored in condenser 6 is discharged abruptly and substantially instantaneously through primary winding 8 of output transformer 9. This induces a chopped wave of high voltage in secondary winding 19 of output transformer 9. This induced chopped wave is transmitted to the detecting circuit including galvanometer 11, and the quality of the insulation on a winding layer of test coil winding 14 can be checked by reading galvanometer 11. Thus, if a coil winding having a short circuit is connected across terminals 13 and 17, the reading of galvanometer 11 will be different from the reading corresponding to a standard reading, set beforehand by adjusting variable resistance 12 and selection switch 16, and while a standard coil having no short circuit in its windings is connected across test terminals 13 and 17.

At the same time, the chopped wave of output transformer 9 is applied to the second chopped wave detecting circuit including SCR 24. The quality of the insulation of the test coil winding 14 can be checked by noting any sound from buzzer 27. For example, if a defective coil having a short circuit is connected to test terminals 13 and 17, buzzer 27 sounds as contacts 28 are closed by relay coil 23. Relay coil 23 is energized through SCR 24 when the latter is gated conductive. The gating point of SCR 24 is adjusted by variable resistor 20 in accordance with the desired detecting level of test coils such as 14.

From the foregoing, it will be clear that the invention coil winding tester has several advantages over known prior art testers. In the first place, it is constructed of simplified components having semi-permanent life, and by virtue of this the tester can be made compact and light in weight, with a long life and able to be handled easily. Additionally, the tester of the invention utilizes chopped waves having a sharp and stable wave formed with exact cycle intervals. The chopped waves are detected by adjusting a variable resistor and a selection switch, which provides greater reliability with a high sensitivity and prevents improper detection. Finally, by virtue of detecting a voltage variation by an SCR, the tester can detect any winding short circuit instantaneously and thus is well adapted for utilization in a process for automatic selection of coil windings.

What is claimed is:

1. A coil winding tester comprising, in combination, a pair of input terminals arranged for connection to a source of AC potential; a step-up power transformer including a first primary winding, connected across said input terminals, and a first secondary winding; a chopped wave oscillatory circuit including current limiting means and a saturable reactor, having ends interconnected at a junction point, connected, in series across said first secondary winding, an output transformer including a second primary winding and a second secondary winding, and a condenser connected between said junction point and a terminal of said second primary winding, the other terminal of said second primary winding being connected to the other end of said saturable reactor; a pair of test terminals connected, respectively, to said other terminal of said second primary winding and to a point on said secondary winding, said test terminals being arranged for connection to a coil winding to be tested, and at least one detecting circuit including test current indicating means, each detecting circuit being connected to said other terminal of said second primary winding and to a point on said second primary winding spaced from said other terminal thereof; whereby, when a test coil winding is connected to said test terminals and said input terminals are connected to a source of AC potential, the potential across said saturable reactor increases toward saturation and said condenser charges and, when said saturable reactor reaches saturation, said condenser discharges abruptly through said second primary winding to induce a high voltage pulse across said test winding and a current flow through said test current indicating means which is indicative of the quality of the insulation of the test coil winding.

2. A coil winding tester, as claimed in claim 1, including a power factor correcting condenser connected across said first secondary winding.

3. A coil winding tester, as claimed in claim 1, including first and second detecting circuits; the test current indicating means of said first detecting circuit comprising a visual indicator, and the test current indicating means of said second detecting circuit comprising an audible indicator.

4. A coil winding tester, as claimed in claim 1, in which said second secondary winding have a plurality of taps; and a selector switch connected to the other of said test terminals and selectively engageable with a selected one of said taps.

5. A coil wnding tester, as claimed in claim 4, including first and second detecting circuits; said first detecting circuit being connected between said other terminal of said second primary winding and an intermediate point of said second primary winding; said second detecting circuit being connected across said second primary winding; said first detecting circuit including a visual test current indicating means, and said second detecting circuit including an audible test current indicating means.

6. A coil winding tester, as claimed in claim 5, in which said first detecting circuit includes, in series, said test terminal connected to said other terminal of said second primary winding, a galvanometer, a load balance stabilizing condenser, an adjustable resistor, and said point on said second primary winding; said variable resistor being operable to adjust the reading of said galvanometer.

7. A coil winding tester, as claimed in claim 5, in which said second test circuit includes a gating transformer having a third primary winding connected across said third second primary winding, and a secondary winding; an SCR and a relay operating coil connected in series across said first primary winding; a gating circuit for said SCR connected across said third secondary winding; and normally open relay contacts connected, in series with said audible test current indicator, across said first primary winding; said relay energizing coil being energized responsive to gating conductive of said SCR to close said relay contacts to energize said audible indicator.

8. A coil winding tester, as claimed in claim 7, including an adjustable resistor connected, in series with said third primary winding, across said second primary winding, said last-named adjustable resistor being operable to adjust the gating point of said SCR.

9. A coil winding tester, as claimed in claim 1, in which said saturable reactor comprises a trochoidal coil-type saturable reactor; said current limiting means comprising a current limiting reactor.

References Cited

UNITED STATES PATENTS

| | | | |
|---|---|---|---|
| 2,249,157 | 7/1941 | Morgan et al. | 324—55 |
| 2,739,233 | 3/1956 | Clayton | 328—33 |
| 2,830,178 | 4/1958 | White | 328—33 |
| 2,987,609 | 6/1961 | Williams et al. | 219—113 XR |
| 3,259,893 | 7/1966 | Parker | 324—54 |
| 3,339,136 | 8/1967 | Rasor et al. | 324—54 |
| 3,354,387 | 11/1967 | Whaley et al. | 324—55 |

GERARD R. STRECKER, Primary Examiner

U.S. Cl. X.R.

324—117; 328—33